United States Patent
Pei

(10) Patent No.: US 11,689,607 B2
(45) Date of Patent: Jun. 27, 2023

(54) DATA PROCESSING METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventor: Jian Guo Pei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 296 days.

(21) Appl. No.: 17/083,607

(22) Filed: Oct. 29, 2020

(65) Prior Publication Data

US 2021/0042889 A1    Feb. 11, 2021

Related U.S. Application Data

(63) Continuation of application No. PCT/CN2019/115082, filed on Nov. 1, 2019.

(30) Foreign Application Priority Data

Dec. 17, 2018 (CN) .......................... 201811545184.4

(51) Int. Cl.
  *G06T 5/00* (2006.01)
  *H04L 67/10* (2022.01)
  (Continued)

(52) U.S. Cl.
  CPC ............ *H04L 67/10* (2013.01); *G06N 3/045* (2023.01); *G06N 3/08* (2013.01); *G06T 5/003* (2013.01);
  (Continued)

(58) Field of Classification Search
  CPC ....... G06T 5/003; G06T 5/002; G06T 7/0004; G06T 7/20; G06T 7/251;
  (Continued)

(56) References Cited

U.S. PATENT DOCUMENTS 10,652,565 B1 * 5/2020 Zhang .................... G06V 10/82
2012/0275690 A1 * 11/2012 Melvin ................... G06V 10/95
                                                                   382/156
(Continued)

FOREIGN PATENT DOCUMENTS

CN       104933463 A       9/2015
CN       107025440 A       8/2017
(Continued)

OTHER PUBLICATIONS

Li et al., Auto-tuning Neural Network Quantization Framework for Collaborative Inference Between the Cloud and Edge, Sep. 27, 2018, Springer, Cham, Artificial Neural Networks and Machine Learning—ICANN 2018, pp. 402-411 (Year: 2018).*

(Continued)

*Primary Examiner* — Ian L Lemieux
*Assistant Examiner* — Woo C Rhim
(74) *Attorney, Agent, or Firm* — Sughrue Mion, PLLC

(57) ABSTRACT

The disclosure provides a data processing method and apparatus, a storage medium and an electronic device. The method includes: performing first processing on data by using a first sub-model corresponding to an artificial intelligence (AI) processing model, to obtain an intermediate processing result, the AI processing model corresponding to the first sub-model and a second sub-model, the first sub-model being generated according to M neural network layers in the AI processing model, the second sub-model being generated according to K neural network layers in the AI processing model, M and K being positive integers greater (Continued)

than or equal to 1; transmitting the intermediate processing result to a first server; and receiving a target processing result from the first server, the target processing result being based on a result of second processing on the intermediate processing result by using the second sub-model.

17 Claims, 6 Drawing Sheets

(51) Int. Cl.
  *G06N 3/08* (2023.01)
  *G06N 3/045* (2023.01)
  *G06V 10/764* (2022.01)
  *G06V 10/82* (2022.01)

(52) U.S. Cl.
  CPC ............ *G06V 10/764* (2022.01); *G06V 10/82* (2022.01); *G06T 2207/20081* (2013.01); *G06T 2207/20084* (2013.01)

(58) Field of Classification Search
  CPC . G06T 2207/20081; G06T 2207/20084; G06T 2207/20201; G06T 3/4046; G06F 2207/4824; G06V 10/82; G06V 10/70; G10L 25/30; G10L 15/16; G10L 17/18; G10L 17/04; G06N 3/02
  See application file for complete search history.

(56) References Cited

U.S. PATENT DOCUMENTS

| | | | | |
|---|---|---|---|---|
| 2016/0379108 | A1* | 12/2016 | Chung | ................. G06N 3/0454 706/27 |
| 2019/0205767 | A1* | 7/2019 | Zhang | ...................... G06N 3/08 |
| 2020/0320396 | A1* | 10/2020 | Vinyals | ................ G06N 3/0445 |
| 2020/0394521 | A1* | 12/2020 | Baker | ........................ G06T 1/20 |
| 2021/0027195 | A1* | 1/2021 | Alakuijala | ............... G06N 3/04 |
| 2021/0224491 | A1* | 7/2021 | Kim | .......................... G06N 3/04 |

FOREIGN PATENT DOCUMENTS

| | | | | | |
|---|---|---|---|---|---|
| CN | 107145946 | A | * | 9/2017 | ............... G06N 3/02 |
| CN | 107909147 | A | | 4/2018 | |
| CN | 108564552 | A | * | 9/2018 | ............. G06T 5/003 |
| CN | 108875899 | A | * | 11/2018 | ............... G06N 3/02 |
| CN | 108875899 | A | | 11/2018 | |
| CN | 109685202 | A | | 4/2019 | |

OTHER PUBLICATIONS

International search report for PCT/CN2019/115082 dated Jan. 16, 2020.
Extended European Search Report dated Feb. 21, 2022 in Application No. 19898280.3.
Written Opinion of the International Searching Authority dated Jan. 16, 2020 in Application No. PCT/CN2019/115082.
Guangli Li et al., "Auto-tuning Neural Network Quantization Framework for Collaborative Inference Between the Cloud and Edge", Advances in Biometrics , International Conference, ICB 2007, Seoul, Korea, Aug. 27-29, 2007, 2018, vol. 11139, Chap. 40, No. 558, pp. 402-411 (10 pages total).
Yiping Kang et al: "Neurosurgeon: Collaborative Intelligence Between the Cloud and Mobile Edge", Architectural Support for Programming Languages and Operating Systems, 2017, pp. 615-629 (15 pages total).

* cited by examiner

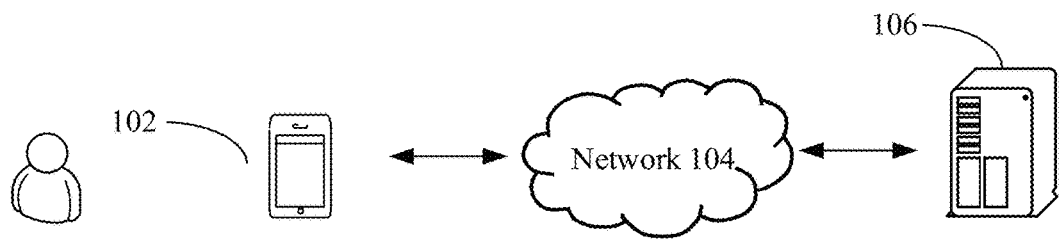

FIG. 1

Perform first processing on to-be-processed data by using a first sub-model corresponding to an artificial Intelligence (AI) processing model, to obtain an intermediate processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1 — S202

Transmit the intermediate processing result to a first server, the first server being configured to perform second processing on the intermediate processing result by using the second sub-model, to obtain a target processing result, target processing including the first processing and the second processing — S204

Receive the target processing result returned by the first server — S206

FIG. 2

DATA PROCESSING METHOD AND APPARATUS, STORAGE MEDIUM, AND ELECTRONIC DEVICE

CROSS-REFERENCE TO RELATED APPLICATION(S)

This application is a bypass continuation application of International Application No. PCT/CN2019/115082, filed on Nov. 1, 2019, which claims priority to Chinese Patent Application No. 201811545184.4, filed with the China National Intellectual Property Administration on Dec. 17, 2018 and entitled "DATA PROCESSING METHOD AND APPARATUS, STORAGE MEDIUM, AND ELECTRONIC DEVICE", the disclosures of which are herein incorporated by reference in their entireties.

FIELD

The disclosure relates to the field of computers, and in particular, to a data processing technology.

BACKGROUND

With the popularity of electronic devices such as mobile devices (for example, mobile phones or smart wearable devices), it is increasingly important to deploy an artificial intelligence (AI) processing model (for example, a deep learning model) in the electronic devices with limited resources (e.g., memories, CPUs, energy consumption, bandwidths, or the like).

The AI processing model (for example, a face recognition model) generally performs data processing by using a large neural network, which achieves a high-accuracy recognition effect. However, the large neural network included in the AI processing model has many layers and nodes, which causes great internal memory overheads and computing workloads. It may be difficult to deploy the AI processing model in the electronic devices with limited resources.

To deploy the AI processing model in the electronic devices with limited resources (e.g., mobile devices), it is important to consider how to reduce internal memories and computing workloads required by the AI processing model. Model compression is generally performed on the AI processing model by using a model compression technology. However, when the related art model compression technology is used, a computing workload and an internal memory overhead of a high-accuracy large neural network are still great for the electronic devices. As a result, the AI processing model cannot be deployed or run. In other words, there is a problem in the related art that the AI processing model cannot be deployed in the electronic devices with limited resources because of a limited model compression capability of the model compression technology.

SUMMARY

Embodiments of the disclosure provide a data processing method and apparatus, a storage medium, and an electronic device, to at least solve the technical problem in the related art that an artificial intelligence (AI) processing model cannot be deployed in electronic devices with limited resources (e.g., mobile devices) because of a limited model compression capability of a model compression technology. Embodiments of the disclosure also solve other technical problems.

According to an aspect of an example embodiment of the disclosure, a data processing method is provided, including: performing first processing on data by using a first sub-model corresponding to an AI processing model, to obtain an intermediate processing result, the AI processing model being configured to perform target processing on the data to obtain a target processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1; transmitting the intermediate processing result to a first server; and receiving a target processing result from the first server, the target processing result being based on a result of second processing on the intermediate processing result by using the second sub-model.

According to an aspect of an example embodiment of the disclosure, a data processing apparatus is provided, including: at least one memory configured to store program code; and at least one processor configured to read the program code and operate as instructed by the program code, the program code including: first processing code configured to cause at least one of the at least one processor to perform first processing on data by using a first sub-model corresponding to an artificial intelligence (AI) processing model, to obtain an intermediate processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1; transmitting code configured to cause at least one of the at least one processor to transmit the intermediate processing result to a first server; and first receiving code configured to cause at least one of the at least one processor to receive a target processing result from the first server, the target processing result being based on a result of second processing on the intermediate processing result by using the second sub-model.

According to an aspect of an example embodiment of the disclosure, a non-transitory computer readable storage medium is further provided, storing a computer program, the computer program being executable by a processor to perform the foregoing method.

According to an aspect of an example embodiment of the disclosure, an electronic device is further provided, including a memory, a processor, and a computer program that is stored in the memory and may be executed by the processor to perform the foregoing method.

BRIEF DESCRIPTION OF THE DRAWINGS

Accompanying drawings described herein are used for providing further understanding for the disclosure and constitute a part of the disclosure. Example embodiments of the disclosure and descriptions thereof are used for explaining the disclosure and do not constitute an improper limitation to the disclosure. In the accompanying drawings:

FIG. 1 is a schematic diagram of an application environment of a data processing method according to an embodiment of the disclosure.

FIG. 2 is a schematic flowchart of an optional data processing method according to an embodiment of the disclosure.

DETAILED DESCRIPTION

Figure 3:
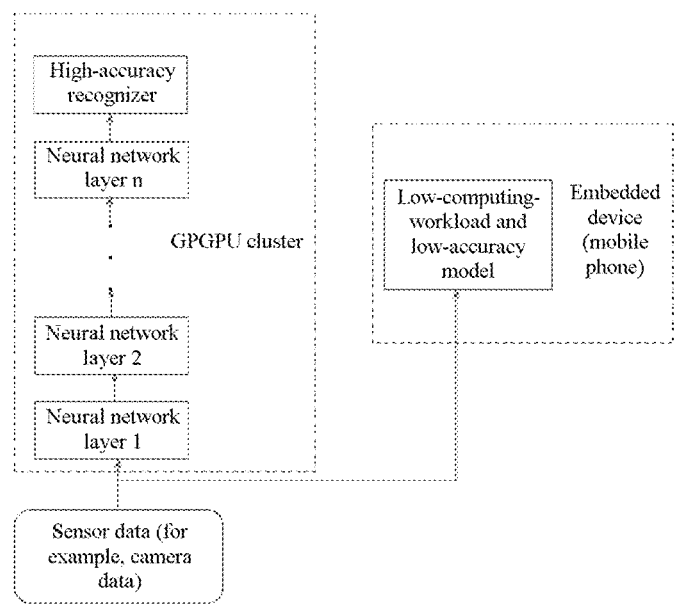
FIG. 3 is a schematic diagram of an optional data processing method according to an embodiment of the disclosure.

To make a person skilled in the art better understand solutions of the disclosure, the following clearly and completely describes the technical solutions in embodiments of the disclosure with reference to the accompanying drawings in the embodiments of the disclosure. Apparently, the described embodiments are merely some rather than all of the embodiments of the disclosure. All other embodiments obtained by a person of ordinary skill in the art based on the embodiments of the disclosure without creative efforts shall fall within the protection scope of the disclosure.

In the specification, claims, and accompanying drawings of the disclosure, the terms "first", "second", and the like are intended to distinguish between similar objects rather than indicating a specific order. The data termed in such a way are interchangeable in proper circumstances, so that the embodiments of the disclosure described herein may be implemented in other orders than the order illustrated or described herein. Moreover, the terms "include", "contain" and any other variants mean to cover the non-exclusive inclusion, for example, a process, method, system, product, or device that includes a list of steps, operations, or units is not necessarily limited to those expressly listed operations or units, but may include other operations or units not expressly listed or inherent to such a process, method, system, product, or device.

According to one aspect of the embodiments of the disclosure, a data processing method is provided. Optionally, the data processing method may be applied to, but not limited to, an application environment shown in FIG. 1. Hereinafter, a mobile device 120 is described an example of an electronic device with limited resources, but the disclosure is not limited to this example. A mobile device 102 is connected to a server 106 by using a network 104. A first sub-model generated according to an artificial intelligence (AI) processing model (for example, a deep learning model) is deployed in the mobile device 102, and a second sub-model generated according to the AI processing model is deployed in the server 106, the first sub-model corresponding to M neural network layers of the AI processing model, the second sub-model corresponding to K neural network layers of the AI processing model, both M and K being positive integers greater than or equal to 1. The AI processing model corresponds to various AI technologies, covering a wide range of fields including both the hardware-level technology and the software-level technology. Examples of the AI processing model may include models based on a speech processing technology, a natural language processing technology, a computer vision technology, machine learning/deep learning, and the like.

After obtaining data to be processed, the mobile device 102 performs first processing on the data by using the first sub-model to obtain an intermediate processing result, and transmits the intermediate processing result to the server 106 by using the network 104.

After receiving the intermediate processing result, the server 106 performs second processing on the intermediate processing result by using the second sub-model to obtain a target processing result of the data, and transmits the obtained target processing result to the mobile device 102 by using the network 104.

The mobile device 102 receives the target processing result returned by the server 106.

Optionally, in this embodiment, the mobile device 102 may include, but is not limited to, at least one of the following: a mobile phone, a tablet computer, a laptop computer, a wearable intelligent device, and the like. The network 104 may include, but is not limited to, a wired network and a wireless network. The wired network may include: a local area network, a metropolitan area network, and a wide area network. The wireless network may include: Bluetooth, Wireless Fidelity (Wi-Fi), a mobile network, and another network implementing wireless communication. The server 106 may include, but is not limited to, at least one of the following: a personal computer (PC) and another device for providing a service. The foregoing is merely an example, and this embodiment is not limited thereto.

In an optional implementation, as shown in FIG. 2, the data processing method may include the following operations:

Operation S202: Perform first processing on data to be processed by using a first sub-model corresponding to an AI processing model, to obtain an intermediate processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1.

Operation S204: Transmit the intermediate processing result to a first server, the first server being configured to perform second processing on the intermediate processing result by using the second sub-model, to obtain a target processing result, target processing including the first processing and the second processing.

Operation S206: Receive the target processing result returned by the first server.

The data processing method may be applied to a process of obtaining data to be processed by a mobile device by using a sensor (for example, a camera of a mobile terminal). For purpose of illustration, description is made below by using an application environment in which the data to be processed is obtained by using the camera of the mobile terminal as an example, but the disclosure is not limited thereto.

An application (for example, a live streaming application) installed in the mobile terminal invokes the camera of the mobile terminal to record a live video, and when invoking the camera, trigger use of a first sub-model deployed in the mobile terminal to process image data obtained by using the camera (for example, process a specific target in the image data, which may include, but is not limited to, filter processing, face-lifting processing, or big eye processing), and transmits intermediate data obtained after the processing to a cloud server by using a wireless network (for example, a mobile network or a Wi-Fi network). The cloud server performs subsequent processing on the intermediate data by using a second sub-model deployed in the cloud server, and returns obtained image data to the mobile terminal to display the image data on the mobile terminal, or transmits the image data to another mobile terminal used to watch the live video.

The operation of obtaining the data to be processed and the operation on the data to be processed may be performed in a real-time or non-real-time manner. A specific obtaining manner is not limited in this embodiment.

In the existing technology, an efficient deep learning method may significantly affect a distributed system, an embedded device, a field programmable gate array (FPGA) used for AI, and the like. For example, a residual neural network (ResNet)-101 has 101 layers of convolution networks and a storage requirement of more than 200 MB, and computes a floating-point number multiplication time required by each picture. For a device such as a mobile phone or an FPGA with only megabytes of resources, it is difficult to deploy such a large model.

Common high-accuracy large models include a region-convolutional neural network (R-CNN), a single shot multibox detector (SSD), and You Only Love One (YOLO, which is a target detection model based on a CNN). A recognition accuracy of the R-CNN decreases as a basic network model decreases. Table 1 shows accuracies of different basic models of a region-based fully convolutional network (R-FCN).

TABLE 1

|  | training data | test data | ResNet-50 | ResNet-101 | ResNet-152 |
|---|---|---|---|---|---|
| R-FCN | 07 + 12 | 07 | 77.0 | 79.5 | 79.6 |
| R-FCN multi-sc train | 07 + 12 | 07 | 78.7 | 80.5 | 80.4 |

However, these high-accuracy large models (even the smallest basic network model ResNet50) cannot be deployed in a mobile device.

Data obtained by a data collection sensor of the mobile device have a larger size. For example, an increasing high-definition camera of a mobile phone generates picture data of a large size. When the picture data is transmitted to a cloud side for computing, a speed is slow, and much traffic needs to be consumed. Therefore, users may not use a high-accuracy deep neural network (DNN) large model.

As shown in FIG. 3, to deploy an AI processing model in a mobile device, a related processing manner is as follows: overall compression is performed on a high-accuracy AI processing model by using a model compression algorithm to compress a large model as a whole into a small model, and a computing workload of a neural network is finally reduced by sacrificing a recognition accuracy of the AI processing model. The foregoing processing method generally includes two operations:

Operation 1: Perform training on a general purpose computer on GPU (GPGPU) cluster having a super computing capability to obtain a neural network model having a high recognition accuracy and a high computing workload.

Operation 2: Train, based on a high-accuracy large model, a small model having a low recognition accuracy and a small computing workload by using a neural network compression technology (e.g., a model compression technology) to finally match a computing capability of an embedded device (e.g., a mobile device).

The current model compression technologies may be generally classified into four types: a parameter pruning and sharing technology, a low-rank factorization technology, a transferred/compact convolutional filter technology, and a knowledge distillation technology.

However, many compressed high-accuracy large models still cannot be deployed at a mobile side because of a limited compression capability of the model compression technology. Table 2 and Table 3 show performance data of related model compression technologies. Table 2 shows performance comparison results of the low-rank factorization technology on an ILSVRC-2012 data set. Table 3 shows performance comparison results of the transferred/compact convolutional filter technology on CIFAR-10 and CIFAR-100 data sets.

TABLE 2

| Model | TOP-5 Accuracy | Speed-up | Compression Rate |
|---|---|---|---|
| Alex Net | 80.3% | 1. | 1. |
| BN Low-rank | 80.56% | 1.09 | 4.94 |
| CP Low-rank | 79.66% | 1.82 | 5. |
| VGG-16 | 90.60% | 1. | 1. |
| BN Low-rank | 90.47% | 1.53 | 2.72 |
| CP Low-rank | 90.31% | 2.05 | 2.75 |
| GoogleNet | 92.21% | 1.0 | 1. |
| BN Low-rank | 91.88% | 1.08 | 2.79 |
| CP Low-rank | 91.79% | 1.20 | 2.84 |

TABLE 3

| Model | CIFAR-100 | CIFAR-10 | Compression Rate |
|---|---|---|---|
| VGG-16 | 34.26% | 9.85% | 1. |
| MBA [45] | 33.66% | 9.76% | 2. |
| CRELU [44] | 34.57 | 9.92% | 2. |
| CIRC [42] | 35.15% | 10.23% | 4. |
| DCNN [43] | 33.57% | 9.65% | 1.62 |

Table 2 and Table 3 show the performance data of the current model compression technologies. Compression rates are all less than 5. Even if the compression rate is 5, a computing workload and an internal memory overhead of a high-accuracy large neural network are still large for a mobile device. As a result, the high-accuracy large neural network cannot be deployed or run in a mobile device.

In addition, in the related art of deploying an AI processing model at a mobile side, a recognition accuracy of the AI processing model is finally sacrificed. For some AI processing models, final accuracies after compression may not be acceptable to users at all, leading to extremely poor experience to the users.

In the disclosure, two sub-models, namely, a first sub-model and a second sub-model, are generated according to an AI processing model. The first sub-model is deployed in a mobile device. The second sub-model is deployed in a server. A computing task is processed by using the AI processing model in a manner of using the first sub-model in combination with the second sub-model, so as to reduce a computing workload and an internal memory overhead of a model of the AI processing model deployed in the mobile device, so that the AI processing model may be deployed in the mobile device. In addition, because only a processing result of the first sub-model is transmitted to the server, an amount of transmitted data is relatively small while privacy of users is protected, thereby improving user experience.

This embodiment of the disclosure is described below in detail with reference to the operations shown in FIG. 2.

In the technical solution provided in operation S202, a mobile device performs first processing on data to be processed by using a first sub-model corresponding to an AI processing model, to obtain an intermediate processing result.

The AI processing model is used for performing target processing on the data to be processed to obtain a target processing result. The data may be multimedia data, which may include, but is not limited to: image data, video data, or voice data. The target processing includes, but is not limited to: image processing (e.g., image deblurring, image object recognition, image beautification, image rendering, and text translation) and voice processing (e.g., voice translation and voice denoising). The obtained target processing result may include, but is not limited to: a result of image processing (e.g., a result of image deblurring, a result of object recognition, a result of image beautification, a result of image rendering, and a result of text translation) and a result of voice processing (e.g., a result of voice denoising and a result of voice translation).

The corresponding first sub-model and second sub-model may be generated according to the AI processing model. Specifically, the first sub-model is generated according to M neural network layers in the AI processing model, and the second sub-model is generated according to K neural network layers in the AI processing model, both M, and K being positive integers greater than or equal to 1. The first sub-model may be deployed in the mobile device. The second sub-model may be deployed in a first server (a cloud server). The M neural network layers and the K neural network layers are different network layers in the AI processing model.

The AI processing model corresponds to the first sub-model and the second sub-model, and a combination of the first sub-model and the second sub-model may implement a function of the AI processing model to achieve the same or similar processing effect.

Before the AI processing model is deployed, an initial AI processing model may be first trained to obtain an AI processing model including N neural network layers.

Optionally, the initial AI processing model may be trained by using training data (which may be multimedia data, for example, image data, video data, or voice data) to obtain an AI processing model (a high-accuracy AI processing model). A training process is known in the art, and therefore details are not described in this embodiment.

After the AI processing model is obtained, two computing segments may be split from the AI processing model. Split M neural network layers constitute a first computing segment. Split K neural network layers constitute a second computing segment. N is greater than or equal to a sum of M and K.

A computing workload and a memory overhead of the first computing segment may be controlled within a range allowed by the mobile device because the first computing segment includes only some neural network layers corresponding to the high-accuracy AI processing model. Therefore, the split first computing segment may be used as the first sub-model to be directly deployed in the mobile device.

To further control the computing workload and the memory overhead of the first computing segment, the neural network layers included in the first computing segment may be compressed by using a model compression algorithm (for example, a distillation method) to obtain the first sub-model.

Optionally, before the data is processed by using the first sub-model corresponding to the AI processing model, the mobile device receives the first sub-model transmitted by a second server, the second server being configured to compress the M neural network layers by using a target compression algorithm to obtain the first sub-model, the target compression algorithm being used for compressing a neural network.

The second server may compress the M neural network layers included in the first computing segment by using the target compression algorithm (the model compression algorithm) for compressing a neural network, to obtain the first sub-model. Correspondingly, the K neural network layers included in the second computing segment are used as the second sub-model.

By performing model compression on the M neural network layers, the computing workload and the internal memory overhead of the first computing segment may be further reduced while an amount of data transmitted to the first server in a usage process may be reduced, and resource consumption of the mobile device may be reduced, thereby improving user experience.

Optionally, the second sub-model is configured to compensate the AI processing model for a processing accuracy sacrificed because of the compression of the first sub-model including the M neural network layers.

After the model compression is performed on the first computing segment, to ensure an accuracy of the entire AI processing model, the neural network layers included in the second computing segment may be trained, and parameter information of the neural network layers included in the second computing segment may be adjusted, to compensate for a sacrificed accuracy caused by the model compression performed on the first computing segment.

Optionally, before the data is processed by using the first sub-model corresponding to the AI processing model, the second server may compress the M neural network layers by using the target compression algorithm to obtain the first sub-model; obtain a first processing result obtained by performing the first processing on a training object by using the first sub-model; and train the K neural network layers to obtain the second sub-model. An input of the K neural network layers is the first processing result. A constraint condition of the training is as follows: a processing accuracy difference between an output result of the second sub-model and a second processing result is less than or equal to a target threshold, the second processing result being a processing result obtained by processing the training object by using the AI processing model (an AI processing model on which model compression is not performed).

When the neural network layers included in the second computing segment are trained, the neural network layers included in the second computing segment may be trained based on a model training algorithm by using the output of the first sub-model as the input of the second computing segment and using a training data processing result of the AI processing model (on which model compression is not performed), to obtain a network recognition layer (the second sub-model) not sacrificing a final accuracy.

After the second server completes the model training and obtains the first sub-model and the second sub-model, the first sub-model may be deployed in the mobile device, and the second sub-model may be deployed in the first server (the cloud server).

Figure 4:
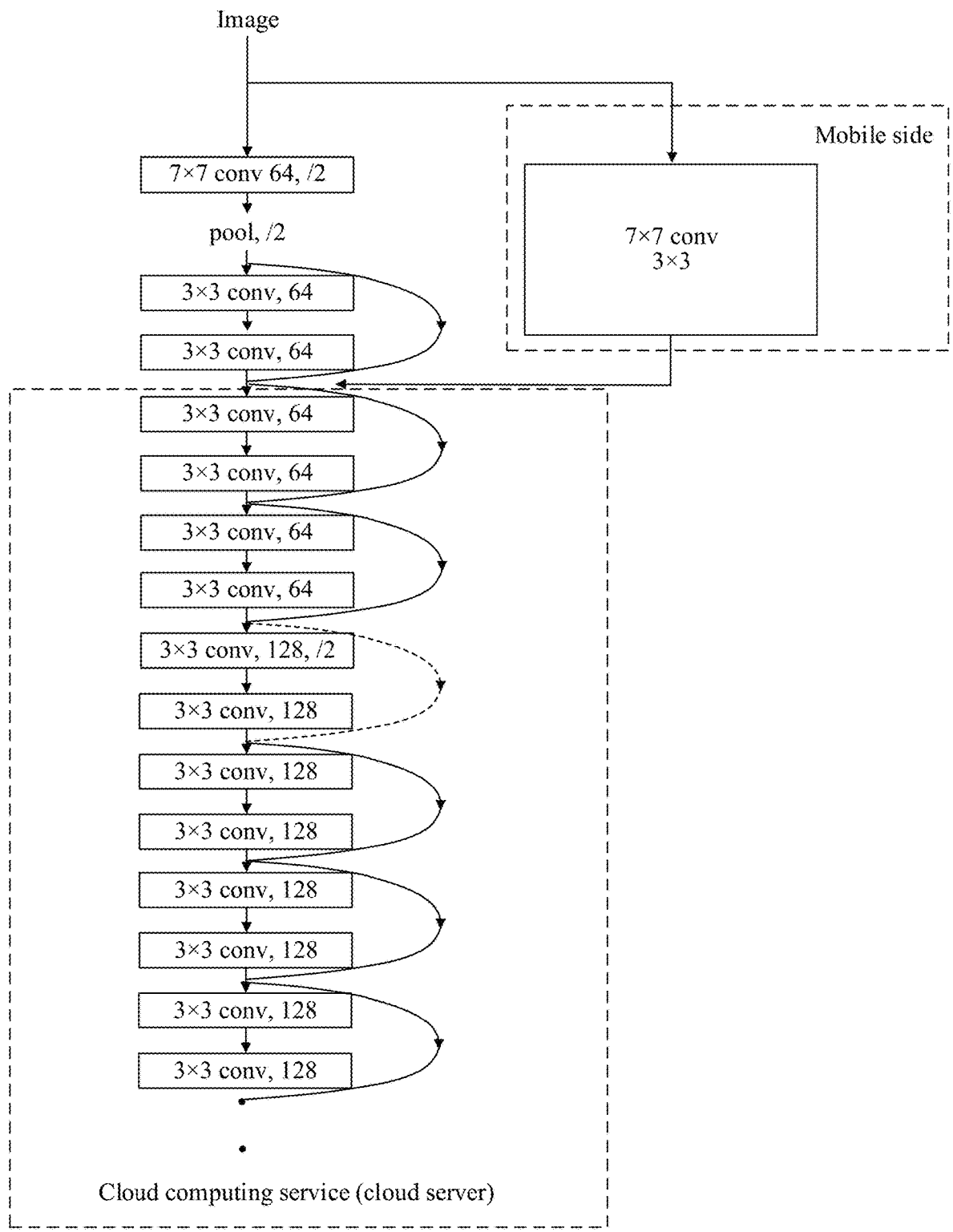
FIG. 4 is a schematic diagram of another optional data processing method according to an embodiment of the disclosure.

For example, to directly deploy a high-accuracy large model R-FCN (whose basic model is ResNet-101) in the mobile device, as shown in FIG. 4, the large model R-FCN is split into two segments: a cloud computing part (the second computing segment) and a mobile computing part (the first computing segment). Only the first three compressed layers of networks are deployed in the mobile device, and networks other than the first three layers are deployed at the cloud side (in this case, N is equal to the sum of M and K).

Figure 5:
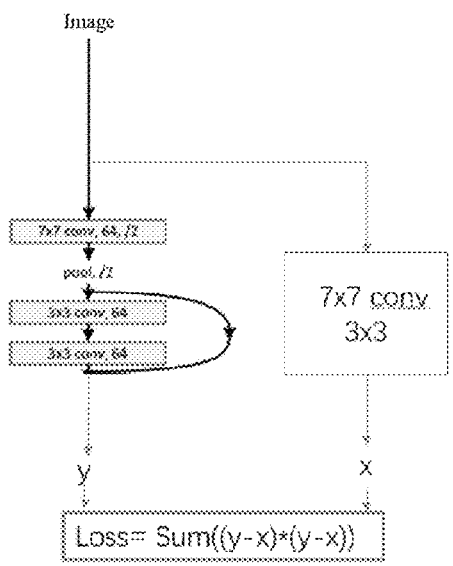
FIG. 5 is a schematic diagram of still another optional data processing method according to an embodiment of the disclosure.

When the networks are compressed, the first three layers of networks may be trained by using the distillation method to obtain compressed networks (the first sub-model), and the compressed networks are deployed in the mobile device. FIG. 5 shows a method for training compressed network layers. An output result closest to that of the first three layers of the original ResNet-101 may be distilled out based on a loss function.

For the cloud computing part, a network recognition layer (the second sub-model) not sacrificing a final accuracy may be trained by using a transfer learning method and using an output of the compressed network as an input, and deployed at the cloud side (for example, the first server).

After the first sub-model is deployed in the mobile device, the mobile device may obtain the data to be processed. The data may be data obtained in a real-time or non-real-time manner. The data may be obtained in a plurality of manners.

In an optional implementation, the data may be received by the mobile device from another device (another mobile device, a terminal device, a server device, or the like).

In another optional implementation, the data may be obtained by the mobile device by using its own data collection component. The data collection component may be, but is not limited to: a sensor (for example, a camera), a microphone, and the like.

Optionally, before the first processing is performed on the data by using the first sub-model corresponding to the AI processing model, the data is obtained through a target sensor of the mobile device.

After obtaining data, the mobile device may perform the first processing on the data by using the first sub-model to obtain the intermediate processing result.

Different types of data may be processed by using different AI processing models. The same type of data may be processed by using one or more AI processing models.

Optionally, in a case that the data is an image, the AI processing model is an AI recognition model for recognizing a target object included in the image. The first processing performed by the first sub-model is first recognition processing.

The performing first processing on data by using a first sub-model corresponding to an AI processing model to obtain an intermediate processing result may include: performing the first recognition processing on the image by using the first sub-model to obtain an intermediate recognition result.

Optionally, in a case that the data is an image, the AI processing model is an AI deblurring model for performing deblurring processing on the image to obtain a deblurring processing result. The first processing performed by the first sub-model is first deblurrring processing.

The performing first processing on data by using a first sub-model corresponding to an AI processing model to obtain an intermediate processing result may include: performing the first deblurring processing on the image by using the first sub-model to obtain an intermediate deblurring result.

Optionally, in a case that the data is data to be translated (which may be voice, picture, or other data that need to be translated), the AI processing model is an AI translation model for translating first language data that uses a first language and that is included in the data into second language data using a second language. The first processing performed by the first sub-model is first translation processing.

The performing first processing on data by using a first sub-model corresponding to an AI processing model to obtain an intermediate processing result may include: performing the first translation processing on the data by using the first sub-model to obtain an intermediate translation result.

In the technical solution provided in operation S204, the intermediate processing result is transmitted to the first server.

The transmission may be performed by using a mobile network of the mobile device, or may be performed by the mobile device by using another wireless network. Because the processing result (a computing result) of the first sub-model is transmitted, a data size is generally much less than a size of the original data while user privacy may also be ensured.

After receiving the intermediate processing result, the first server may perform second processing on the intermediate processing result by using the deployed second sub-model to obtain a target processing result.

For different types of data, intermediate processing results may be processed by using second sub-models corresponding to different AI processing models. For the same type of data, an intermediate processing result may be processed by using one or more second sub-models corresponding to one or more AI processing models.

Optionally, the second processing is second recognition processing in a case that the data is an image. A target recognition result is used for indicating a target object in the image.

The first server performs the second recognition processing on the intermediate recognition result by using the second sub-model to obtain a recognition result of the target object in the image.

Optionally, the second processing is second deblurring processing in a case that the data is an image. A target recognition result is used for indicating a deblurring result of the image.

The first server performs the second deblurring processing on the intermediate deblurring result by using the second sub-model to obtain a target deblurring result of the image.

Optionally, the second processing is second translation processing in a case that the data is data to be translated. A target recognition result is a target translation result including the second language data.

The first server performs the second translation processing on the intermediate translation result by using the second sub-model to obtain a target translation result including the second language data.

After obtaining the target processing result, the first server transmits the target translation result to the mobile device.

In the technical solution provided in operation S206, the mobile device receives the target processing result returned by the first server.

After receiving the target processing result returned by the first server, the mobile device may display the target recognition result (in the case of the data being an image) or play the target recognition result (in the case of the data being voice data, for example, data to be translated) on the mobile device.

Figure 6:
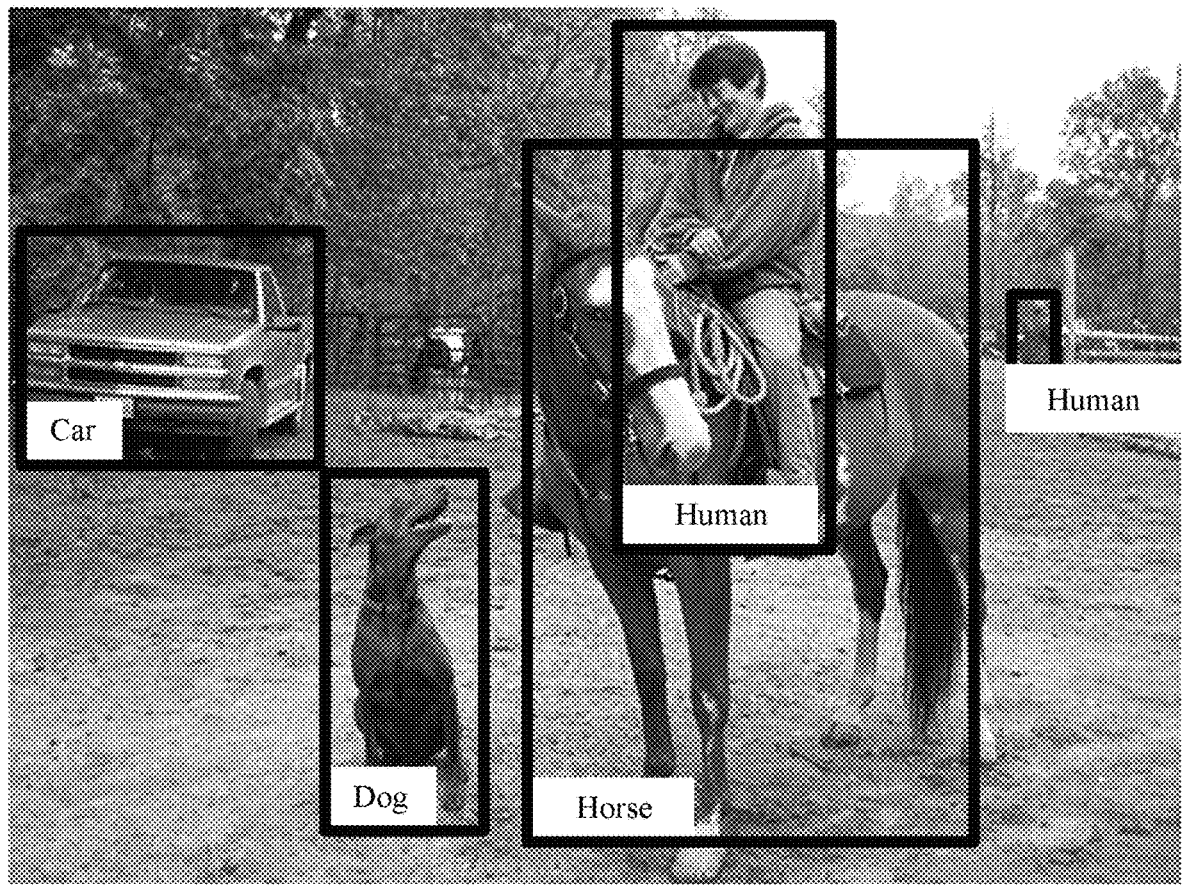
FIG. 6 is a schematic diagram of an optional picture object recognition result according to an embodiment of the disclosure.

For purpose of illustration, description is made below with reference to an example. A high-accuracy AI processing model may be applied to a video product for performing AI processing on the video product, which may include, but is not limited to: AI automatic deblurring, AI automatic picture recognition, and the like, for example, an AI automatic picture recognition technology. Common high-accuracy large models include: R-CNN, SSD, YOLO, and the like. A recognition effect is shown in FIG. 6.

In an object recognition method in this example, a computing manner of segmenting an AI processing model is used: two computing parts, namely, a mobile computing part and a cloud computing part, corresponding to a high-accuracy AI processing model are generated according to the high-accuracy AI processing model. The mobile computing part corresponds to the first M (for example, 3) neural network layers of the AI processing model, and is deployed at a mobile terminal side (e.g., a mobile device or an embedded device, for example, a mobile phone). The cloud computing part corresponds to the remaining part of the AI processing model (other neural network layers other than the first M neural network layers), and is deployed at a cloud side (a cloud cluster, a cloud computing center, or a cloud server).

When sensor data is processed, computing is performed through the mobile computing part on the mobile device to obtain an intermediate result, and the obtained intermediate result is transmitted to the cloud side by using a network (for example, a mobile network or a wireless network) connecting the mobile side and the cloud side. The cloud side receives the intermediate result transmitted by the mobile side, continues to perform computing by using the remaining part of the AI processing model, and transmits a final processing result to the mobile side.

A computing workload and an internal memory overhead at the mobile side may be reduced in the foregoing segmented computing manner, to ensure feasibility of deploying the high-accuracy AI processing model at the mobile side. In addition, a data communication amount of the mobile side may be reduced while user privacy may be protected by using the intermediate result of the mobile computing part as an input of the cloud computing part, thereby improving user experience.

Optionally, some computing parts corresponding to the AI processing model may be compressed: model compression is performed on the mobile computing part to obtain a partial high-compression-ratio part (a high-compression-ratio computing segment, that is, high-compression-ratio neural network layers). The cloud computing part is not compressed and used as another uncompressed part (a high-accuracy computing segment, that is, high-accuracy neural network layers).

When sensor data is processed, a network intermediate result (an output result of the high-compression-ratio neural network layers) approximate to a result of the first one or more layers of an original network is obtained on the mobile device through computing by using high-compression-ratio neural network layers, and the intermediate result is transmitted to the cloud side by using a network connecting the mobile side and the cloud side.

The cloud side receives the intermediate result of the mobile side, continues to perform computing by using the remaining computing part, and transmits a final recognition result to the mobile side.

Because the high-compression-ratio neural network layers describe simple network layers, the computing workload may be greatly reduced, and lost information is much less than that of full network compression. In addition, an output result approximate to that of the first one or more layers of the original network may be obtained through computing by using the high-compression-ratio neural network layers, and a data size of the output result (less than a data size of an output result of an uncompressed mobile computing part) is generally much less than a size of the original sensor data, so that a final data transmission amount is reduced. In addition, an original recognition accuracy when the AI processing model is used for processing may be maintained as much as possible through computing by using the another uncompressed part, thereby improving user experience.

Figure 7:
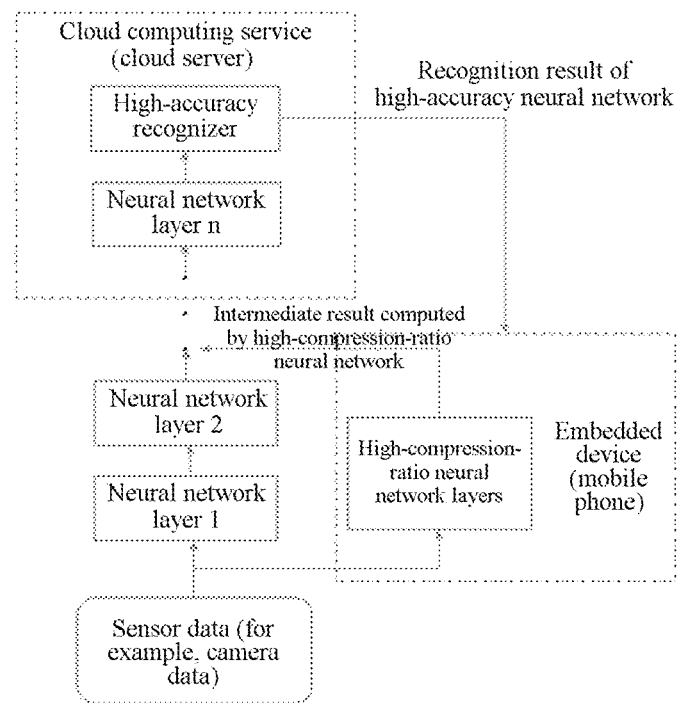
FIG. 7 is a schematic diagram of still another optional data processing method according to an embodiment of the disclosure.

For a process of object recognition, as shown in FIG. 7, the object recognition method in this example includes the following operations:

Operation 1: Deploy an AI processing model at a mobile side and a cloud side.

The AI processing model may be trained, to obtain a mobile computing part and a cloud computing part. The mobile computing part is deployed at the mobile side, and the cloud computing part is deployed at the cloud side.

When the AI processing model is trained, for an uncompressed AI processing model, an original model may be trained, to obtain a high-accuracy AI processing model. For a partially compressed AI processing model, based on the foregoing training, the first n (for example, 3) neural network layers of the AI processing model may be trained and compressed by using a first algorithm (for example, a distillation method) for compressing a model and using obtained intermediate data of the high-accuracy AI processing model as a label, to obtain a mobile computing part. Other neural network layers other than the first n (for example, 3) layers of the AI processing model may be trained by using a second algorithm (for example, transfer learning), using the intermediate data and/or final data of the high-accuracy AI processing model as a label, and using an output result of the mobile computing part as an input, to obtain a cloud computing part.

The partial compression manner of the AI processing model may be applied to deployment of all AI processing models at the mobile sides.

Description is made by using a current large model R-FCN having a relatively good accuracy as an example. A basic model of the large model R-FCN is ResNet-101. As shown in FIG. 4, two computing parts, namely, a mobile computing part and a cloud computing part, are generated according to ResNet-101.

The mobile computing part may be a compressed network. The first three neural network layers of an AI processing model may be trained and compressed as guided by the distillation method and using intermediate data of a high-accuracy AI processing model as a label to obtain high-compression-ratio neural network layers (the mobile computing part), and the neural network layers are finally deployed at the mobile side.

FIG. 5 shows a manner of training compressed network layers. An output result closest to that of the first three layers of the original ResNet-101 may be distilled out based on a loss function shown in FIG. 5.

The cloud computing part may be a high-accuracy network. Neural network layers other than the first three neural network layers in the AI processing model may be trained by using a transfer learning method to obtain the cloud computing part. An input of the high-accuracy network is an output of the compressed network. The training process may be performed with reference to an output result (intermediate data and/or final data) of the high-accuracy AI processing model to obtain a network recognition layer not sacrificing or substantially affecting a final accuracy, and the network recognition layer is finally deployed at the mobile side.

During the training, an output result of the high-compression-ratio neural network layers is used as an input of the remaining sub-modules of the high-accuracy model, to further train the sub-modules to ensure that the model is adapted to an input change after the compression, to reach an accuracy of the original AI processing model.

When the AI processing model is deployed, the foregoing process may be performed by a specific device (a target device) or a specific server, or may be performed by the cloud side. After the compressed network and the high-accuracy network are trained, network deployment may be performed by respectively transmitting the obtained compressed network and high-accuracy network to the mobile side and the cloud side.

Operation 2: Obtain sensor data by using a sensor of a mobile device.

After the AI processing model is deployed, the mobile device may obtain the sensor data by using the sensor of the mobile device. The sensor data may be any data obtained by using the sensor, and may include, but is not limited to: voice data, image data, or other data.

Operation 3: Obtain an intermediate result through computing by using a high-compression-ratio neural network of the mobile device, and transmit the intermediate result to a cloud computing center.

In the mobile device, computing is performed for the sensor data by using the mobile computing part (the high-compression-ratio neural network) of the AI processing model to obtain the intermediate result, and the intermediate result is transmitted to the cloud computing center by using a network.

Operation 4: Obtain a final recognition result through computing by using a high-accuracy neural network of the cloud computing center, and transmit the final recognition result to the mobile device.

In the foregoing technical solutions in this example, segmented computing is performed on a high-accuracy AI processing model. A high-compression-ratio computing segment and a high-accuracy computing segment corresponding to the AI processing model are generated according to the AI processing model, and are respectively deployed at a mobile side and a cloud side. A computing task is completed with the same performance as the high-accuracy AI processing model by performing relay computing. Further, in a manner of partially compressing the AI processing model, the first one or more layers of sub-networks (rather than an entire model network) of the high-accuracy AI processing model are replaced with a high-compression-ratio neural network to complete a computing workload of the first one or more layers, which is different from other full network compression methods lowering a computing workload by sacrificing an accuracy. In the foregoing manner, users may experience a high-accuracy neural network model with the help of a cloud side by sacrificing a small amount of traffic, it is convenient to deploy the high-accuracy AI processing model at a mobile side, and a cloud computing need is extended.

In operations S202 to S206 in FIG. 2, a terminal-side device performs first processing on data by using a first sub-model corresponding to an AI processing model, to obtain an intermediate processing result, the AI processing model being configured to perform target processing on the data, to obtain a target processing result, the AI processing model corresponding to the first sub-model and a second sub-model, the first sub-model corresponding to M neural network layers in the AI processing model, the second sub-model corresponding to K neural network layers in the AI processing model, M and K being positive integers greater than or equal to 1; transmits the intermediate processing result to a first server, the first server being configured to perform second processing on the intermediate processing result by using the second sub-model, to obtain the target processing result, the target processing including the first processing and the second processing; and receives the target processing result returned by the first server, which solves the technical problem in the related art that an AI processing model cannot be deployed in mobile devices because of a limited model compression capability of a model compression technology, thereby improving user experience.

In an optional technical solution, before the data is processed by using the first sub-model corresponding to the AI processing model, the data processing method further includes:

S1: Receive the first sub-model transmitted by a second server, the second server being configured to compress the M neural network layers by using a target compression algorithm to obtain the first sub-model, the target compression algorithm being used for compressing a neural network.

Optionally, the second sub-model is configured to compensate the AI processing model for a processing accuracy sacrificed because of the compression of the M neural network layers.

Optionally, before the data is processed by using the first sub-model corresponding to the AI processing model, the data processing method further includes:

S1: The second server compresses the M neural network layers by using a target compression algorithm to obtain the first sub-model.

S2: The second server obtains a first processing result obtained by performing the first processing on a training object by using the first sub-model.

S3: The second server trains the K neural network layers to obtain the second sub-model, an input of the K neural network layers being the first processing result, a constraint condition of the training being as follows: a processing accuracy difference between an output result of the second sub-model and a second processing result is less than or equal to a target threshold, the second processing result being a processing result obtained by processing the training object by using the AI processing model.

In this embodiment, the M neural network layers are compressed by using the target compression algorithm to obtain the first sub-model, which may reduce a computing workload and an internal memory overhead of the first sub-model and an amount of data included in the intermediate processing result transmitted by the mobile device to the first server, thereby improving user experience. Further, a processing accuracy of the data is increased by training the first sub-model and the second sub-model and compensating, by using the second sub-model, for a sacrificed accuracy caused by the compression of the first sub-model, to improve user experience.

In an optional technical solution of an embodiment, the performing first processing on data by using a first sub-model corresponding to an AI processing model to obtain an intermediate processing result includes: performing first recognition processing on data, which is an image, by using the first sub-model to obtain an intermediate recognition result, the first processing being the first recognition processing, the image including a target object, the AI processing model being configured to recognize the target object in the image; and the receiving a target processing result returned by the first server includes: receiving a target recognition result returned by the first server, the target processing result being the target recognition result, the target recognition result being obtained by performing second recognition processing on the intermediate recognition result by the first server by using the second sub-model, the second processing being the second recognition processing, the target recognition result being used for indicating the target object in the image.

In an optional technical solution of an embodiment, the performing first processing on data by using a first sub-model corresponding to an AI processing model to obtain an intermediate processing result includes: performing first deblurring processing on data, which is an image, by using the first sub-model, to obtain an intermediate deblurring result, the first processing being the first deblurring processing, the AI processing model being configured to perform a deblurring operation on the image to obtain a target deblurring result; and the receiving a target processing result returned by the first server includes: receiving the target deblurring result returned by the first server, the target processing result being the target deblurring result, the target deblurring result being obtained by performing second deblurring processing on the intermediate deblurring result by the first server by using the second sub-model, the second processing being the second deblurring processing.

In an optional technical solution of an embodiment, the performing first processing on data by using a first sub-model corresponding to an AI processing model, to obtain an intermediate processing result includes: performing first translation processing on data, which is to be translated, by using the first sub-model, to obtain an intermediate translation result, the first processing being the first translation processing, the AI processing model being configured to translate first language data that uses a first language and that is included in the data to be translated into second language data using a second language; and the receiving a target processing result returned by the first server includes: receiving a target translation result returned by the first server, the target processing result being the target translation result, the target translation result being obtained by performing second translation processing on the intermediate translation result by the first server by using the second sub-model, the second processing being the second translation processing, the target translation result including the second language data.

In this embodiment, one or more different types of processing (for example, object recognition processing, image deblurring processing, or data translation data) are performed on different types of data, to meet different applications or needs of users, improve terminal service processing capabilities, and improve user experience.

In an optional technical solution, before the performing first processing on data by using a first sub-model corresponding to an AI processing model, the data processing method further includes:

S1: Obtain data to be processed by using a target sensor of the mobile device.

In this embodiment, the data is obtained by using the target sensor of the mobile device, so that real-time processing may be performed on the data, to adapt to different application requirements, and improve user experience.

For simple descriptions, the foregoing method embodiments are described as a series of action combinations. However, a person skilled in the art would understand that the disclosure is not limited to the sequence of the described actions because according to the disclosure, some operations may use another sequence or may be simultaneously performed. It is to be further appreciated by a person skilled in the art that the embodiments described in this specification all belong to example embodiments, and the actions and modules in the embodiments are not necessarily required by the disclosure.

Figure 8:
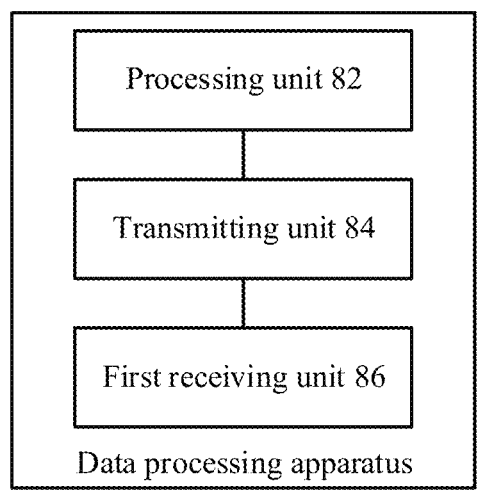
FIG. 8 is a schematic structural diagram of an optional data processing apparatus according to an embodiment of the disclosure.

According to an embodiment of the disclosure, a data processing apparatus configured to implement the foregoing data processing method is further provided. FIG. 8 is a schematic diagram of an optional data processing apparatus according to an embodiment of the disclosure. As shown in FIG. 8, the apparatus may include:

(1) a processing unit 82, configured to perform first processing on data by using a first sub-model corresponding to an AI processing model, to obtain an intermediate processing result, the AI processing model being configured to perform target processing on the data, to obtain a target processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1;

(2) a transmitting unit 84, configured to transmit the intermediate processing result to a first server, the first server being configured to perform second processing on the intermediate processing result by using the second sub-model, to obtain the target processing result, the target processing including the first processing and the second processing; and (3) a first receiving unit 86, configured to receive the target processing result returned by the first server.

The data processing apparatus may be applied to, but is not limited to, a process of obtaining data by a mobile device by using a sensor (for example, a camera of a mobile terminal).

The processing unit 82 in this embodiment may be configured to perform operation S202 in the embodiments of the disclosure, the transmitting unit 84 in this embodiment may be configured to perform operation S204 in the embodiments of the disclosure, and the first receiving unit 86 in this embodiment may be configured to perform operation S206 in the embodiments of the disclosure.

In this embodiment of the disclosure, a terminal-side device performs first processing on data by using a first sub-model corresponding to an AI processing model, to obtain an intermediate processing result, the AI processing model being configured to perform target processing on the data, to obtain a target processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1; transmits the intermediate processing result to a first server, the first server being configured to perform second processing on the intermediate processing result by using the second sub-model, to obtain the target processing result, the target processing including the first processing and the second processing; and receives the target processing result returned by the first server. Accordingly, the data processing apparatus according to an embodiment of the disclosure may solve the technical problem in the related art that an AI processing model cannot be deployed in mobile devices because of a limited model compression capability of a model compression technology, thereby improving user experience.

In an optional solution, the apparatus further includes:

a second receiving unit, configured to receive the first sub-model transmitted by a second server before the data is processed by using the first sub-model corresponding to the AI processing model, the second server being configured to compress the M neural network layers by using a target compression algorithm to obtain the first sub-model, the target compression algorithm being used for compressing a neural network.

In this embodiment, the M neural network layers are compressed by using the target compression algorithm to obtain the first sub-model, which may reduce a computing workload and an internal memory overhead of the first sub-model and an amount of data included in the intermediate processing result transmitted by the mobile device to the first server, thereby improving user experience.

In an optional technical solution, the processing unit 82 includes a processing module. The first receiving unit 86 includes a receiving module.

(1) The processing module is configured to perform first recognition processing on data, which is an image, by using the first sub-model, to obtain an intermediate recognition result, the first processing being the first recognition processing, the image including a target object, the AI processing model being configured to recognize the target object in the image.

(2) The receiving module is configured to receive a target recognition result returned by the first server, the target processing result being the target recognition result, the target recognition result being obtained by performing second recognition processing on the intermediate recognition result by the first server by using the second sub-model, the second processing being the second recognition processing, the target recognition result being used for indicating the target object in the image.

In another optional technical solution, the processing unit 82 includes a first processing module. The first receiving unit 86 includes a first receiving module.

(1) The first processing module is configured to perform first deblurring processing on data, which is an image, by using the first sub-model, to obtain an intermediate deblurring result, the first processing being the first deblurring processing, the AI processing model being configured to perform a deblurring operation on the image to obtain a target deblurring result.

(2) The first receiving module is configured to receive the target deblurring result returned by the first server, the target processing result being the target deblurring result, the target deblurring result being obtained by performing second deblurring processing on the intermediate deblurring result by the first server by using the second sub-model, the second processing being the second deblurring processing.

In still another optional technical solution, the processing unit 82 includes a second processing module. The first receiving unit 86 includes a second receiving module.

(1) The second processing module is configured to perform first translation processing on data, which is to be translated, by using the first sub-model, to obtain an intermediate translation result, the first processing being the first translation processing, the AI processing model being configured to translate first language data that uses a first language and that is included in the to-be-translated data into second language data using a second language.

(2) The second receiving module is configured to receive a target translation result returned by the first server, the target processing result being the target translation result, the target translation result being obtained by performing second translation processing on the intermediate translation result by the first server by using the second sub-model, the second processing being the second translation processing, the target translation result including the second language data.

In this embodiment, one or more different types of processing (for example, object recognition processing, image deblurring processing, or data translation data) are performed on different types of data, to meet different applications or needs of users, improve terminal service processing capabilities, and improve user experience.

In an optional solution, the apparatus further includes:

an obtaining unit, configured to obtain the data by using a target sensor of the mobile device before the first processing is performed on the data by using the first sub-model corresponding to the AI processing model.

In this embodiment, the data is obtained by using the target sensor of the mobile device, so that real-time processing may be performed on the data, to adapt to different application requirements, and improve user experience.

According to still another aspect of the embodiments of the disclosure, a storage medium is further provided, storing a computer program, the computer program being configured to perform operations in any one of the method embodiments when running.

Optionally, in this embodiment, the storage medium may be configured to store a computer program for performing the following operations:

S1: Perform first processing on data by using a first sub-model corresponding to an AI processing model, to obtain an intermediate processing result, the AI processing model being configured to perform target processing on the data, to obtain a target processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1.

S2: Transmit the intermediate processing result to a first server, the first server being configured to perform second processing on the intermediate processing result by using the second sub-model, to obtain a target processing result, the target processing including the first processing and the second processing.

S3: Receive a target processing result returned by the first server.

Optionally, in this embodiment, a person of ordinary skill in the art would understand that all or some of the operations in the methods of the foregoing embodiments may be implemented by a program instructing relevant hardware of the terminal device. The program may be stored in a computer-readable storage medium. The storage medium may include: a flash drive, a read-only memory (ROM), a random access memory (RAM), a magnetic disk, an optical disc, or the like.

Figure 9:
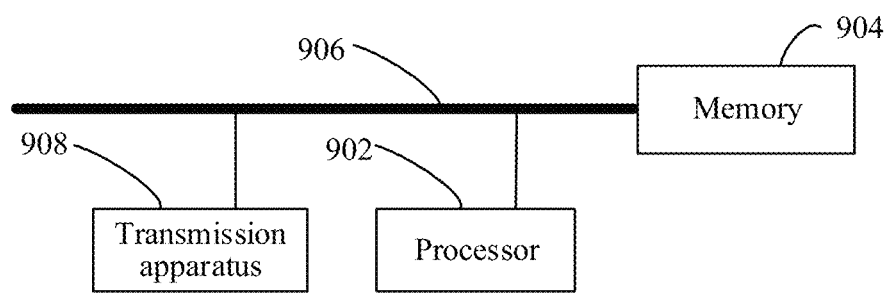
FIG. 9 is a schematic structural diagram of an optional electronic device according to an embodiment of the disclosure.

According to still another aspect of the embodiments of the disclosure, an electronic device configured to implement the foregoing data processing method is further provided. As shown in FIG. 9, the electronic device includes: a processor 902, a memory 904, a data bus 906, a transmission apparatus 908, and the like. The foregoing components may be connected through the data bus 906 or other lines for data transmission. The memory stores a computer program, and the processor is configured to perform operations in any one of the method embodiments through the computer program.

Optionally, in this embodiment, the electronic device may be located in at least one of a plurality of network devices in a computer network.

Optionally, in this embodiment, the processor may be configured to perform the following operations through the computer program:

S1: Perform first processing on data by using a first sub-model corresponding to an AI processing model, to obtain an intermediate processing result, the AI processing model being configured to perform target processing on the data, to obtain a target processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1.

S2: Transmit the intermediate processing result to a first server, the first server being configured to perform second processing on the intermediate processing result by using the second sub-model, to obtain a target processing result, the target processing including the first processing and the second processing.

S3: Receive a target processing result returned by the first server.

Optionally, a person of ordinary skill in the art would understand that, the structure shown in FIG. 9 is only schematic. The electronic device may be a terminal device such as an intelligent device, a smartphone (for example, an Android mobile phone or an iOS mobile phone), a tablet computer, a palmtop computer, a mobile Internet device (MID), or a PAD. FIG. 9 does not constitute a limitation on a structure of the electronic device. For example, the electronic device may further include more or fewer components (for example, a network interface) than those shown in FIG. 9, or have configuration different from that shown in FIG. 9.

The memory 904 may be configured to store a software program and module, for example, a program instruction/module corresponding to the data processing method and apparatus in the embodiments of the disclosure. The processor 902 runs the software program and module stored in the memory 904, to implement various functional applications and data processing, that is, implement the foregoing data processing method. The memory 904 may include a high-speed RAM, and may further include a non-volatile memory such as one or more magnetic storage devices, a flash, or another non-volatile solid-state memory. In some examples, the memory 904 may further include memories remotely disposed relative to the processor 902, and these remote memories may be connected to a terminal through a network. Instances of the network include, but are not limited to, the Internet, an intranet, a local area network, a mobile communication network, and a combination thereof.

The transmission apparatus 908 is configured to receive or send data by using a network. Specific examples of the network may include a wired network and a wireless network. In an example, the transmission apparatus 908 includes a network interface controller (NIC) that may be connected to another network device and router by using a cable, to communicate with the Internet or a local area network. In an embodiment, the transmission apparatus 908 may be a radio frequency (RF) module or Bluetooth, which is configured to perform communication with the Internet in a wireless manner.

The sequence numbers of the foregoing embodiments of the disclosure are merely for the convenience of description, and do not imply the preference among the embodiments.

In a case that the integrated unit in the foregoing embodiments is implemented in the form of a software function unit and sold or used as an independent product, the integrated unit may be stored in the foregoing computer-readable storage medium. Based on such an understanding, the part contributing to the existing technology, or all or some of the technical solutions of the disclosure may be implemented in a form of a software product. The computer software product is stored in a storage medium and includes several instructions for instructing one or more computer devices (which may be a personal computer, a server, a network device, or the like) to perform all or some of the operations of the method described in the embodiments of the disclosure.

In the foregoing embodiments of the disclosure, the descriptions of the embodiments have their respective focuses. For a part that is not described in detail in an embodiment, reference may be made to related descriptions in other embodiments.

In the several embodiments provided in the disclosure, it is to be understood that the disclosed apparatus may be implemented in other manners. The apparatus embodiments described above are merely examples. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of the disclosure may be integrated into one processing unit, or each of the units may exist alone physically, or two or more units are integrated into one unit. The integrated unit may be implemented in the form of hardware, or may be implemented in the form of software functional unit.

According to various embodiments of the disclosure, first processing is performed on data by using a first sub-model corresponding to an AI processing model, to obtain an intermediate processing result, the AI processing model corresponding to the first sub-model and a second sub-model, the first sub-model being generated according to M neural network layers in the AI processing model, the second sub-model being generated according to K neural network layers in the AI processing model, M and K being positive integers greater than or equal to 1. The intermediate processing result is transmitted to a first server, the first server being configured to perform second processing on the intermediate processing result by using the second sub-model, to obtain a target processing result, target processing including the first processing and the second processing. The target processing result returned by the first server is received. The first sub-model including the M neural network layers and the second sub-model including the K neural network layers included in the AI processing model are deployed on different devices, and values of M and K may be set to flexibly set sizes of the first sub-model and the second sub-model, so that computing workloads and internal memory overheads of the sub-models are controlled. Accordingly, the embodiments of the disclosure may deploy the AI processing model in a mobile device. As the AI processing model may be deployed in the mobile device, user experience is improved based on a high-accuracy AI processing model, and the technical problem in the related art that an AI processing model cannot be deployed in mobile devices because of a limited model compression capability of a model compression technology is solved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like. Software components, elements, modules, units, or codes may be implemented or written using a computer programming language.

The foregoing descriptions are merely example implementations of the disclosure, and a person of ordinary skill in the art may further make several improvements and modifications without departing from the principle of the disclosure. These improvements and modifications are also to be considered as the protection scope of the disclosure.

What is claimed is:

1. A data processing method, applied to an electronic device, the method comprising:
    performing first processing on data by using a first sub-model corresponding to an artificial intelligence (AI) processing model, to obtain an intermediate processing result, the AI processing model being split into M neural network layers and K neural network layers, the first sub-model being generated according to the split M neural network layers in the AI processing model, a second sub-model being generated according to the split K neural network layers in the AI processing model, M and K being positive integers greater than or equal to 1;
    transmitting the intermediate processing result to a first server; and
    receiving a target processing result from the first server, the target processing result being based on a result of second processing on the intermediate processing result by using the second sub-model,
    wherein the method further comprises, prior to the performing the first processing:
    obtaining a first processing result obtained by performing the first processing on a training object by using the first sub-model; and
    training the K neural network layers that are split from the AI processing model, to obtain the second sub-model meeting a training constraint condition, an input of the K neural network layers being the first processing result, the training constraint condition being: a processing accuracy difference between an output result of the second sub-model and a second processing result is less than or equal to a target threshold, the second processing result being a processing result obtained by processing the training object by using N network layers of the AI processing model, N being greater than or equal to a sum of M and K.

2. The method according to claim 1, further comprising:
    receiving the first sub-model that is obtained based on the split M neural network layers from a second server.

3. The method according to claim 2, wherein the first sub-model is further based on compression, by using a target compression algorithm, of the M neural network layers that are split from the AI processing model, and
    wherein the target processing result is based on compensation of the AI processing model for a processing accuracy sacrificed because of compression of the M neural network layers.

4. The method according to claim 1, wherein the performing the first processing comprises:
    performing first recognition processing on the data, which is an image, by using the first sub-model, to obtain an intermediate recognition result, the AI processing model being configured to recognize a target object in the image, and
    wherein the receiving the target processing result comprises: receiving a target recognition result from the first server, the target recognition result being based on second recognition processing on the intermediate recognition result by using the second sub-model, the target recognition result indicating the target object in the image.

5. The method according to claim 4, wherein the performing the first processing further comprises:
    performing first deblurring processing on the data, which is the image, by using the first sub-model, to obtain an intermediate deblurring result, the AI processing model being configured to perform a deblurring operation on the image to obtain a target deblurring result, and
    wherein the receiving the target processing result further comprises: receiving the target deblurring result from the first server, the target deblurring result being based on second deblurring processing on the intermediate deblurring result by using the second sub-model.

6. The method according to claim 4, wherein the data is the image including text and the performing the first processing further comprises:
    performing first translation processing on the text included in the image of the data by using the first sub-model, to obtain an intermediate translation result, the AI processing model being configured to translate the text, which is included in the image and in a first language into text in a second language, and
    wherein the receiving the target processing result further comprises: receiving a target translation result from the first server, the target translation result being based on second translation processing on the intermediate translation result by using the second sub-model, the target translation result comprising data corresponding to the translated text in the second language.

7. The method according to claim 1, further comprising, prior to the performing the first processing:
    obtaining the data by using a data collection component of the electronic device, the data collection component comprising a sensor and/or a microphone.

8. The method according to claim 1, wherein the first sub-model is deployed on the electronic device, and the first server is a cloud server.

9. A data processing apparatus, comprising:
    at least one memory configured to store program code; and
    at least one processor configured to read the program code and operate as instructed by the program code, the program code comprising:
    first processing code configured to cause at least one of the at least one processor to perform first processing on data by using a first sub-model corresponding to an artificial intelligence (AI) processing model, to obtain an intermediate processing result, the AI processing model being split into M neural network layers and K neural network layers, the first sub-model being generated according to the split M neural network layers in the AI processing model, a second sub-model being generated according to the split K neural network layers in the AI processing model, M and K being positive integers greater than or equal to 1;
    transmitting code configured to cause at least one of the at least one processor to transmit the intermediate processing result to a first server; and
    first receiving code configured to cause at least one of the at least one processor to receive a target processing result from the first server, the target processing result being based on a result of second processing on the intermediate processing result by using the second sub-model,
    wherein the program code further comprises:
    second processing code configured to cause at least one of the at least one processor to obtain a first processing result obtained by performing the first processing on a training object by using the first sub-model; and
    training code configured to cause at least one of the at least one processor to train the K neural network layers that are split from the AI processing model, to obtain the second sub-model meeting a training constraint condition, an input of the K neural network layers being the first processing result, the training constraint condition being: a processing accuracy difference between an output result of the second sub-model and a second processing result is less than or equal to a target threshold, the second processing result being a processing result obtained by processing the training object by using N network layers of the AI processing model, N being greater than or equal to a sum of M and K.

10. The apparatus according to claim 9, wherein the program code further comprises:
    second receiving code configured to cause at least one of the at least one processor to receive the first sub-model that is obtained based on the split M neural network layers from a second server.

11. The apparatus according to claim 9, wherein the first sub-model is further based on compression, by using a target compression algorithm, of the M neural network layers that are split from the AI processing model, and
    wherein the target processing result is based on compensation of the AI processing model for a processing accuracy sacrificed because of compression of the M neural network layers.

12. The apparatus according to claim 9, wherein the first processing code is configured to cause at least one of the at least one processor to perform first recognition processing on the data, which is an image, by using the first sub-model, to obtain an intermediate recognition result, the AI processing model being configured to recognize a target object in the image, and
    wherein the first receiving code is configured to cause at least one of the at least one processor to receive a target recognition result from the first server, the target recognition result being based on second recognition processing on the intermediate recognition result by using the second sub-model, the target recognition result indicating the target object in the image.

13. The apparatus according to claim 12, wherein the first processing code is further configured to cause at least one of the at least one processor to perform first deblurring processing on the data, which is the image, by using the first sub-model, to obtain an intermediate deblurring result, the AI processing model being configured to perform a deblurring operation on the image to obtain a target deblurring result, and
    wherein the first receiving code is further configured to cause at least one of the at least one processor to receive the target deblurring result from the first server, the target deblurring result being based on second deblurring processing on the intermediate deblurring result by using the second sub-model.

14. The apparatus according to claim 12, wherein the data is the image including text and the first processing code is further configured to cause at least one of the at least one processor to perform first translation processing on the text included in the image of the data by using the first sub-model, to obtain an intermediate translation result, the AI processing model being configured to translate the text, which is included in the image and in a first language into text in a second language, and
    wherein the first receiving code is further configured to cause at least one of the at least one processor to receive a target translation result from the first server, the target translation result being based on second translation processing on the intermediate translation result by using the second sub-model, the target translation result comprising data corresponding to the translated text in the second language.

15. The apparatus according to claim 9, wherein the program code further comprises:
    obtaining code configured to cause at least one of the at least one processor to obtain the data by using a data collection component of an electronic device, the data collection component comprising a sensor and/or a microphone.

16. The apparatus according to claim 9, wherein the first sub-model is deployed on an electronic device, and the first server is a cloud server.

17. A non-transitory computer readable storage medium, storing a computer program, the computer program being executable by at least one processor to perform:

performing first processing on data by using a first sub-model corresponding to an artificial intelligence (AI) processing model, to obtain an intermediate processing result, the AI processing model being split into M neural network layers and K neural network layers, the first sub-model being generated according to the split M neural network layers in the AI processing model, a second sub-model being generated according to the split K neural network layers in the AI processing model, M and K being positive integers greater than or equal to 1;

transmitting the intermediate processing result to a first server; and receiving a target processing result from the first server, the target processing result being based on a result of second processing on the intermediate processing result by using the second sub-model, wherein the computer program is executable by the at least one processor to further perform:

obtaining a first processing result obtained by performing the first processing on a training object by using the first sub-model; and training the K neural network layers that are split from the AI processing model, to obtain the second sub-model meeting a training constraint condition, an input of the K neural network layers being the first processing result, the training constraint condition being: a processing accuracy difference between an output result of the second sub-model and a second processing result is less than or equal to a target threshold, the second processing result being a processing result obtained by processing the training object by using N network layers of the AI processing model, N being greater than or equal to a sum of M and K.

* * * * *